United States Patent
Motegi (10) Patent No.: US 8,041,842 B2
(45) Date of Patent: Oct. 18, 2011

(54) PRINTING DEVICE AND LOGIC PACKET PROCESSING METHOD

(75) Inventor: Tsutomu Motegi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1001 days.

(21) Appl. No.: 11/901,874

(22) Filed: Sep. 19, 2007

(65) Prior Publication Data
US 2008/0069097 A1 Mar. 20, 2008

(30) Foreign Application Priority Data

Sep. 19, 2006 (JP) .................................. 2006-253094

(51) Int. Cl.
G06F 3/00 (2006.01)
H04L 12/56 (2006.01)
(52) U.S. Cl. ......................................... 710/5; 370/395.4
(58) Field of Classification Search .... 710/5; 370/395.4
See application file for complete search history.

(56) References Cited

U.S. PATENT DOCUMENTS

| 7,024,516 | B2 * | 4/2006 | Lu ................................. | 711/108 |
| 7,219,211 | B1 * | 5/2007 | Greene et al. .................. | 711/216 |
| 2003/0223361 | A1 * | 12/2003 | Hussain et al. ............... | 370/230 |
| 2004/0052262 | A1 * | 3/2004 | Visweswaraiah .......... | 370/395.4 |

FOREIGN PATENT DOCUMENTS

| JP | 2004-102378 | 4/2004 |
| JP | 2006-007638 | 1/2006 |
| JP | 2006-139585 | 6/2006 |
| JP | 2006-173843 | 6/2006 |

OTHER PUBLICATIONS hpoj Reference, Device protocol, http://doc.gnu-darwin.org/, Jul. 31, 2010.*

* cited by examiner

*Primary Examiner* — Henry Tsai
*Assistant Examiner* — Hyun Nam
(74) *Attorney, Agent, or Firm* — Nutter McClennen & Fish LLP; John J. Penny, V.

(57) ABSTRACT

Disclosed herein is a printing device connected to a client, the printing device including: a reception unit which receives plural types of logic packets from the client; a hardware packet processing unit which processes the logic packets by hardware; a software packet processing unit which includes a microprocessor and processes the logic packets by software; and a sorting unit which sorts the plural types of logic packets into a logic packet to be processed by the hardware packet processing unit and a logic packet to be processed by the software packet processing unit, wherein the sorting unit sorts a reply requiring logic packet including contents replying to the client as the logic packet to be processed by the hardware packet processing unit when sorting the plural types of logic packets.

6 Claims, 10 Drawing Sheets

PRINTING DEVICE AND LOGIC PACKET PROCESSING METHOD

The entire disclosure of Japanese Patent Application No. 2006-253094, filed Sep. 19, 2006 is expressly incorporated by reference herein.

BACKGROUND

1. Technical Field

The present invention relates to a technology for suppressing a microprocessor used in a printing process from becoming a high load status in a printing device.

2. Related Art

In a printing system in which a client (a personal computer or the like) is connected to a printing device, data communication between the client and the printing device has been performed by transmitting/receiving a logic packet. For example, a printing system in which a client is connected to a printer through a universal serial bus (USB), print data or a control command is transmitted/received by means of a logic packet defined by a D4 protocol (hereinafter, referred to as a "D4 packet"). The D4 protocol is a communication protocol defined by the IEEE 1284.4. Examples of a system for transmitting/receiving print data or a control command by means of the D4 packet include a network system disclosed in JP-A-2006-139585.

In general, a printing device includes a microprocessor which executes predetermined software (firmware) so as to drive a printing mechanism (printer engine), thereby performing a printing process. In a printing device for performing data communication with a client by transmitting/receiving a logic packet, the microprocessor analyzes the logic packet to perform a predetermined process in addition to a printing process. In such a configuration, if a processing load of the logic packet is increased due to the frequent reception of the logic packet from the client, the microprocessor is in a high load status and thus the printing process becomes stagnant. Thus, it is take much time to perform the printing process.

SUMMARY

An advantage of some aspects of the invention is that it provides a technology for suppressing a microprocessor used in a printing process from becoming a high load status in a printing device for transmitting/receiving a logic packet to/from a client.

According to an aspect of the invention, there is provided a printing device connected to a client, the printing device including: a reception unit which receives plural types of logic packets from the client; a hardware packet processing unit which processes the logic packets by hardware; a software packet processing unit which includes a microprocessor and processes the logic packets by software; and a sorting unit which sorts the plural types of logic packets into a logic packet to be processed by the hardware packet processing unit and a logic packet to be processed by the software packet processing unit.

In the printing device, since the plural types of logic packets are sorted into the logic packet to be processed by the hardware packet processing unit and the logic packet to be processed by the software packet processing unit, it is possible to reduce load of the software packet processing unit compared with a configuration in which all the logic packets are processed by the software packet processing unit. Accordingly, it is possible to suppress the microprocessor included in the software packet processing unit from becoming a high load status.

In the print device, the sorting unit may sort a reply-requiring logic packet, including contents for replying to the client, as the logic packet to be processed by the hardware packet processing unit when sorting the plural types of logic packets.

By this configuration, since the logic packet which requires a reply to the client to cause high processing load is processed by the hardware packet processing unit, it is possible to reduce the processing load of the microprocessor.

In the printing device, the reply-requiring logic packet may be a credit request packet for requesting a credit for controlling a flow between the client and the printing device.

By this configuration, since the credit request packet which is frequently transmitted/received in order to control the flow is processed by the hardware packet processing unit, it is possible to remarkably reduce the processing load of the microprocessor.

In the printing device, a print mode may include at least a high quality print mode and a low quality print mode, and the sorting unit may sort a credit request packet for transmitting print data as the packet to be processed by the hardware packet processing unit when the high quality print mode is set as the print mode and sorts the credit request packet for transmitting the print data as the software packet processing unit when the low quality print mode is set as the print mode.

By this configuration, when the printing process is performed in the high quality print mode, the processing load of the microprocessor is increased in order to a large amount of print data. However, since the credit request packet for transmitting the print data used in the printing process can be processed by the hardware, it is possible to suppress the microprocessor from becoming a very high load status.

In the printing device, each of the logical packets may include a header portion and a body portion, and the types of the logic packets may be identified by an identifier included in the header portion or a combination of the identifier included in the header portion and an identifier included in the body portion.

By this configuration, the type of the logic packet received from the client can be identified by the identifier included in the header portion and the identifier included in the body portion. Accordingly, the sorting unit can sort the logic packet by identifying the type of the logic packet using the identifiers.

In the printing device, the processing mode of the logic packets may include a first processing mode for processing a specific type of logic packet by the hardware packet processing unit or a second processing mode for processing the specific type of logic packet by the software packet processing unit. The printing device may include a processing mode switching unit which switches the processing mode to the first processing mode or the second processing mode according to an operation status of the printing device.

By this configuration, when the operation status of the printing device is an operation status which increases the processing load of the microprocessor, the processing mode is switched to the first processing mode so as to reduce the processing load of the microprocessor and, when the operation status of the printing device is an operation status which hardly increases the processing load of the microprocessor, the processing mode is switched to the second processing mode so as to process the logic packet.

In the printing device, the processing mode switching unit may switch the processing mode to the second processing mode when the operation status of the printing device is an error status and may switch the processing mode to the first processing mode when the operation status of the printing device is a normal status.

By this configuration, since the specific type of logic packet received from the client is processed by the software when the printing device is in the error status, it is possible to freely change the processing contents according to an error correction status. Accordingly, it is possible to suppress the logic packet from being uniformly processed by the hardware even in the error status and to suppress the same credit number as the normal status (error-free status) from being notified to the client even when the printing process cannot be performed.

The invention can be implemented by a variety of forms, such as a logic packet processing method, a computer program for realizing the logic packet processing method or the function of the printing device, a recording medium including the computer program recorded therein, and a data signal implemented in a carrier including the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
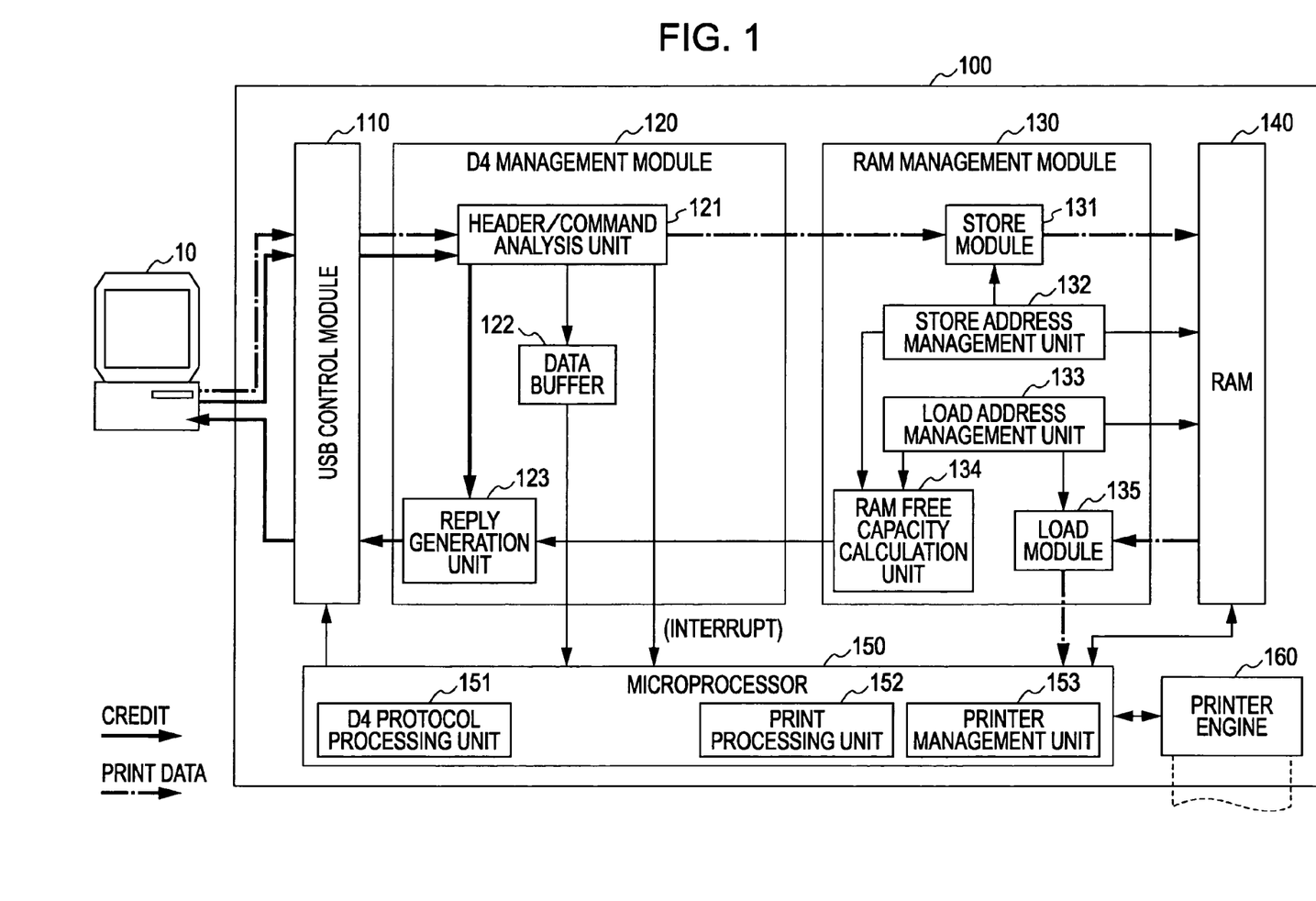
FIG. 1 is a schematic block diagram showing the configuration of a printer 100 according to a first embodiment of the invention.

Hereinafter, embodiments of the invention will be described in the following order.
A. First Embodiment
B. Second Embodiment
C. Third Embodiment
D. Modified Example A. First Embodiment A1. Schematic Configuration of Printing Device FIG. 1 is a schematic block diagram showing the configuration of a printer 100 according to a first embodiment of the invention. The printer 100 includes a USB control module 110, a D4 management module 120, a RAM management module 130, a RAM 140, a microprocessor 150 and a printer engine 160. The USB control module 110 includes a physical interface for connecting the printer 100 to a personal computer 10 through a USB and analyzes a USB protocol such that the printer 100 functions as a USB device. The D4 management module 120 sorts a D4 packet received from the personal computer 10 and performs a predetermined process according to a D4 protocol with respect to a specific type of D4 packet (credit request packet). The RAM management module 130 writes data to the RAM 140, reads data from the RAM 140, or manages a write address/read address in the RAM 140.

The D4 management module 120 includes a header/command analysis unit 121, a data buffer 122 and a reply generation unit 123. The header/command analysis unit 121 analyzes a header of the D4 packet and a portion of a command of a packet having a specific header. The data buffer 122 stores a specific D4 (D4 packet excluding a credit request packet and a print data packet). The reply generation unit 123 generates a D4 packet for a credit request reply.

The RAM management module 130 includes a store module 131, a store address management unit 132, a load address management unit 133, a RAM free capacity calculation unit 134 and a load module 135. The store module 131 writes data received from the header/command analysis unit 121 in the RAM 140. The store address management unit 132 manages a data write address in the RAM 140. The load address management unit 133 manages a data read address in the RAM 140. The free capacity calculation unit 134 periodically acquires addresses which are respectively managed by the store address management unit 132 and the load address management unit 133, calculates a free capacity of the RAM 140 on the basis of these addresses, and periodically notifies the reply generation unit 123.

The USB control module 110, the D4 management module 120, the RAM management module 130 and the RAM 140 are configured by hardware.

The microprocessor 150 executes predetermined software (firmware) stored in the RAM 140 and functions as a D4 protocol processing unit 151, a print processing unit 152 and a printer management unit 153. The D4 protocol processing unit 151 analyzes the D4 protocol and executes a predetermined process. The print processing unit 152 drives a printer engine 160 on the basis of print data (data written in a page description language) received from the personal computer 10 and performs a printing process. The printer management unit 153 manages a status such as the residual quantity of ink or existence of an error. In FIG. 1, an arrow of a thick solid line indicates the flow of a credit request/reply packet and an arrow of thick dotted line indicates the flow of print data.

The USB control module 110 corresponds to a reception unit, the reply generation unit 123 corresponds to a hardware packet processing unit, the D4 protocol processing unit 151 corresponds to a software packet processing unit, and a header/command analysis unit 121 corresponds to a sorting unit.

Figure 2:
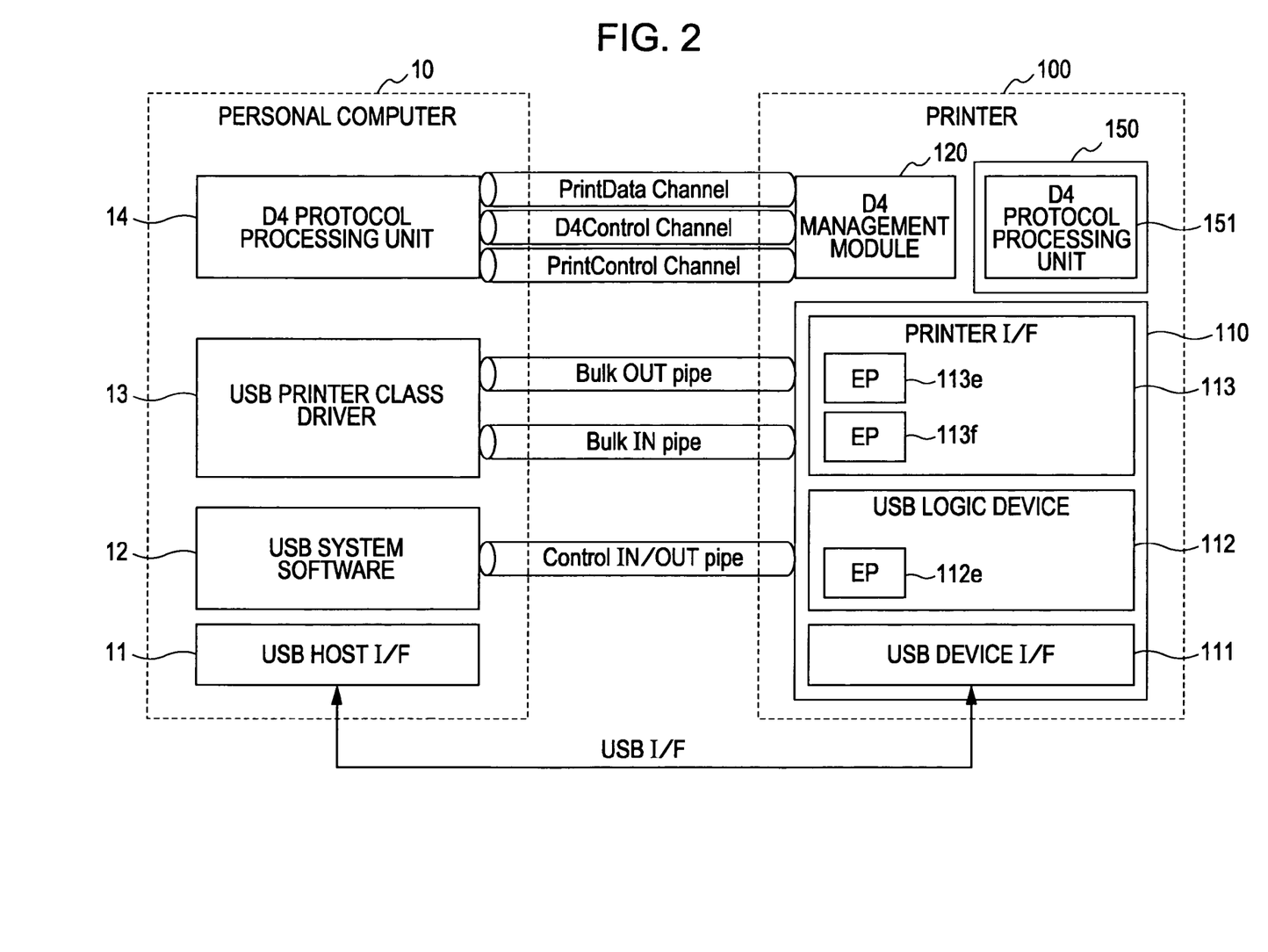
FIG. 2 is a view showing a hierarchical structure of a function for transmitting/receiving data between a personal computer 10 and the printer 100.

FIG. 2 is a view showing a hierarchical structure of a function for transmitting/receiving the D4 packet between a personal computer 10 and the printer 100. In the printer 100, the USB control module 110 becomes a lowermost layer and the D4 management module 120 and the D4 protocol processing unit 151 are located thereon. The USB control module 110 includes a USB device interface 111 for providing a physical interface, a USB logic device 112 and a printer interface 113. The USB logic device 112 includes a control end point 112e, and the printer interface 113 includes a bulk OUT end point 113e and a bulk IN end point 113f.

The term "end point" described herein is a logic resource for performing communication with a host. The control end point 112e is an end point for transmitting/receiving a standard device request. The term "standard device request" described herein is a basic request which needs to be supported by all USBs. The bulk OUT end point 113e and the bulk IN end point 113f are end points for transmitting/receiving a message for performing the printing process.

The personal computer 10 includes a USB host interface (hardware) 11, USB system software 12, a USB printer class driver 13 and a D4 protocol processing unit 14, all of which are located in this order from the lowermost layer. A control pipe is provided between the USB system software 12 and the control end point 112e. The control pipe is a dedicated logic channel for controlling a variety of settings in USB communication. A bulk OUT pipe is provided between the USB printer class driver 13 and the bulk OUT end point 113e and a bulk IN pipe is provided between the USB printer class driver and the bulk IN end point 113f. The bulk OUT pipe and the bulk IN pipe are dedicated logic channels for transmitting/receiving a message for performing the printing process.

In addition to the above-described logic channels, three logic channels (a print data channel, a D4 control channel and a print control channel) for transmitting/receiving the D4 packet are established between the personal computer 10 and the printer 100. The three logic channels are terminated by the D4 management module 120 or the D4 protocol processing unit 151 in the printer 100. The print data channel is a logic channel for transmitting/receiving the D4 packet including the print data. The D4 control channel is a logic channel for transmitting/receiving the D4 packet for controlling the transmission/reception of the D4 packet. The print control channel is a logic channel for transmitting/receiving the D4 packet for controlling the printing process.

Figure 3A:
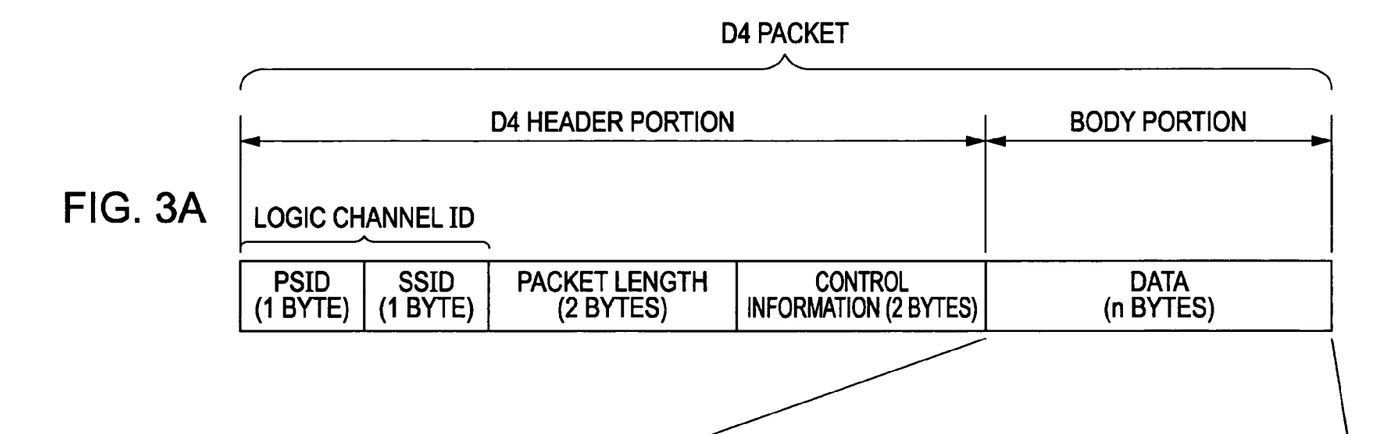
FIG. 3 is a view showing the configuration of a D4 packet (credit request/reply packet).

FIG. 3A shows the configuration of the D4 packet transmitted/received between the personal computer 10 and the printer 100. The D4 packet includes 6-byte header portion (D4 header) and a body portion. The header portion includes a primary socket ID (PSID) field, a secondary socket ID (SSID) field, a packet length field, and a control information field. The PSID field and the SSID field are used as logic channel IDs for identifying the three logic channels (print data channel, the D4 control channel and the print control channel). Since a plurality of logic channels can be set as the print data channel, the logic channel IDs are used as the IDS for identifying the plurality of print data channels. In the control information field, information controlling the transmission of data in the D4 protocol is stored. In the body portion, a D4 command and a parameter thereof, a reply for the D4 command or the print data is stored.

In the D4 protocol, a flow control process is performed in the transmission/reception of the D4 packet. In more detail, a transmitter of data requests to a receiver for the notification of the number of receivable data packets (also called a credit number), and the receiver notifies the transmitter of the credit number. The transmitter transmits a predetermined number of data packets including the notified credit number to the receiver.

Figures 3B, 3C:
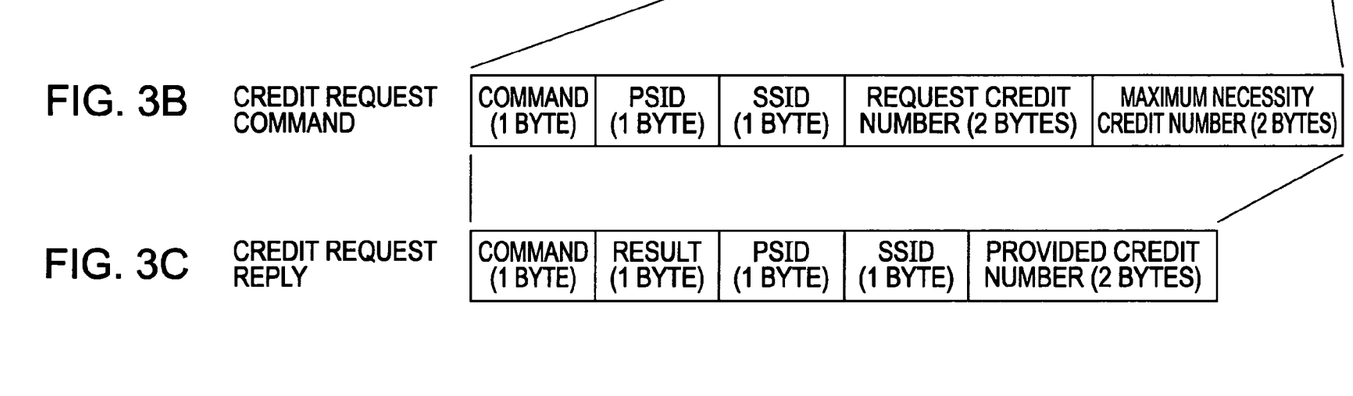

FIG. 3B shows the configuration of the body portion of the D4 packet used in a credit request. The body portion of a credit request packet includes a command field, a PSID field, a SSID field, a request credit number field and a maximum necessity credit number field. In the command field, a credit request command is stored. In the PSID field and the SSID field, the ID of a logic channel for transmitting the D4 packet using a credit is stored. In the request credit number field and the maximum necessity credit number field, a value which is set according to the size of data to be transmitted or the size of a transmission buffer is stored.

FIG. 3C shows the configuration of the body portion of the D4 packet used in a reply for the credit request. The body portion of a credit request reply packet includes a command field, a result field, a PSID field, a SSID field and a provided credit number field. In the command field, a credit request reply command is stored. In the result field, information indicating the result (success/failure) of the credit request is stored. In the PSID field and the SSID field, the IDs of logic channels for requesting the credit are stored. In the provided credit number field, the credit number notified by the receiver is stored. In the credit request packet and the credit request reply packet, the ID of a logic channel (D4 control channel) for transmitting/receiving the credit request/reply packet is stored as the logic channel ID of the header portion.

A2. Print Data Transmission Sequence

Figure 4:
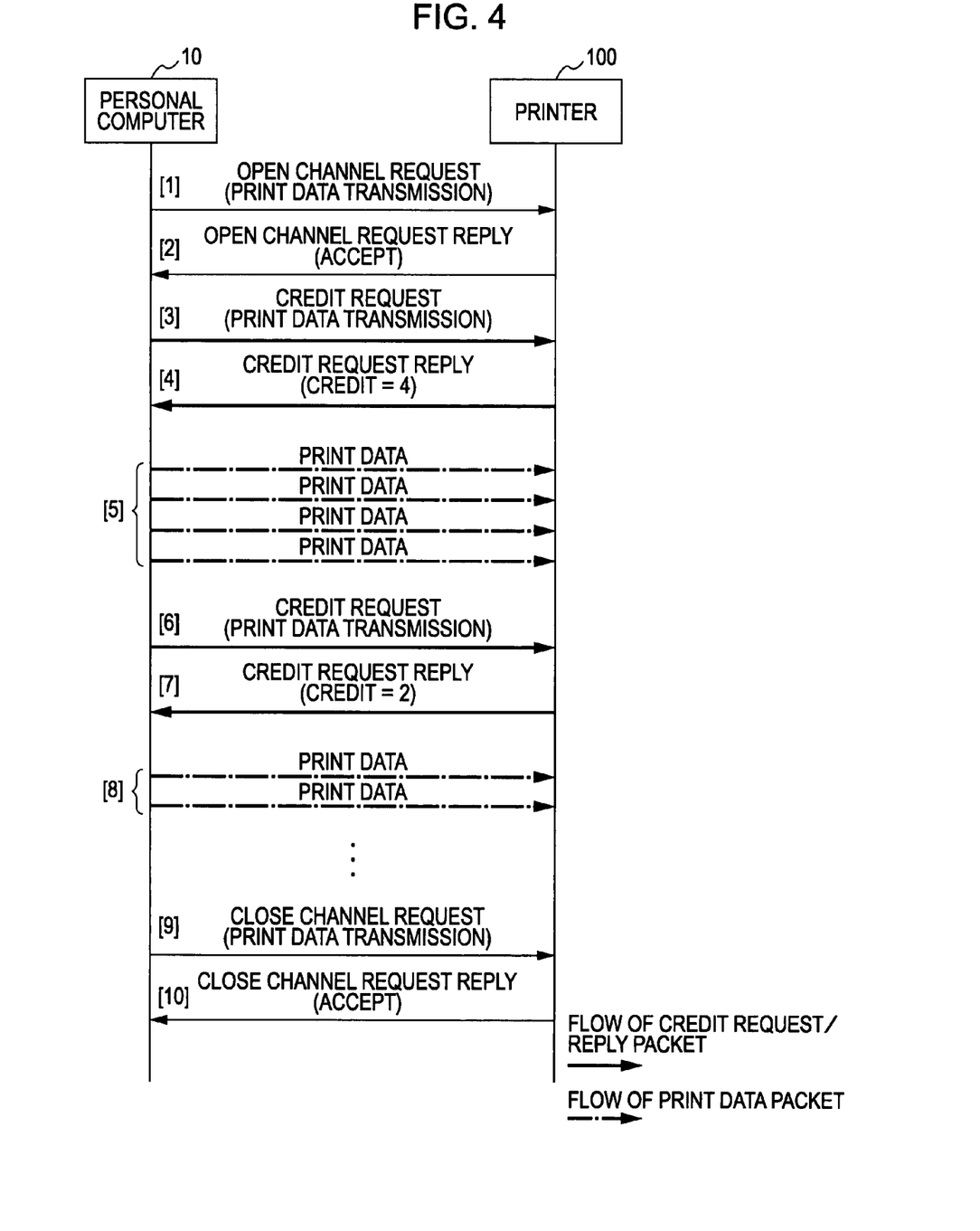
FIG. 4 is a sequence view showing an example of an operation for transmitting print data from the personal computer 10 to the printer 100.

FIG. 4 is a sequence view showing an example of an operation for transmitting print data from the personal computer 10 to the printer 100. In a step [1], the personal computer 10 transmits an open channel request packet to the printer 100 and, in a step [2], the printer 100 transmits an open channel request reply packet to the personal computer 10. The open channel request packet is transmitted in order to open a print data channel for transmitting print data which will be transmitted. In the example of FIG. 4, the printer 100 returns a message (Accept) that the requested print data channel is opened as the open channel request reply packet. The open channel request packet and the open channel request reply packet are transmitted through the D4 control channel.

In a step [3], the personal computer 10 transmits a credit request packet to the printer 100. In a step [4], the printer 100 transmits a credit request reply packet to the personal computer 10. The credit request packet and the credit request reply packet are transmitted through the D4 control channel. In the example of FIG. 4, the credit number is "4".

In a step [5], the personal computer 10 transmits print data packets. Here, since the personal computer 10 receives "4" as the credit number in the step [4], four print data packets are continuously transmitted. The print data packets are transmitted through the opened print data channel.

When the transmission of the print data of the credit number is completed, the personal computer 10 transmits the credit request packet to the printer 100 again in a step [6], and the printer 100 transmits the credit request reply packet to the personal computer 10 in a step [7]. In the example of FIG. 4, the personal computer 10 receives the credit number "2" in the step [7]. Accordingly, in a step [8], the personal computer 10 continuously transmits two print data packets to the printer 100. Whenever the credit number is received from the printer 100, the continuous transmission of the print data packets of the credit number is repeated. When the transmission of all print data is completed, the personal computer 10 transmits a close channel request packet to the printer 100 in a step [9]. In a step [10], the printer 100 transmits a close channel request reply packet to the personal computer 10. The close channel request packet is transmitted in order to close the print data channel used in the transmission of the print data. The close channel request packet and the close channel request reply packet are transmitted through the D4 control channel. Although not shown, the status (the residual quantity of ink or the existence of the error) of the printer 100 is periodically notified to the personal computer 10 using the printer control channel between the personal computer 10 and the printer 100.

Various types (commands) of D4 packets are transmitted/received between the personal computer 10 and the printer 100 through the three logic channels (the print data channel, the D4 control channel and the print control channel). As shown in FIG. 4, in the transmission/reception of the print data, the credit request packet, the credit request reply packet and the print data packet are frequently transmitted/received between the personal computer 10 and the printer 100. Accordingly, in the printer 100 according to the present embodiment, the credit request packet, the credit request reply packet and the print data packet which are frequently transmitted/received are processed by hardware in a packet reception process such that the microprocessor 150 is suppressed from becoming a high load status.

The credit request packet corresponds to a reply-requiring logic packet. Three D4 packets (a D4 packet for the print data, a D4 packet for the D4 control and a D4 packet for print control) which are respectively transmitted through the three logic channels (the print data channel, the D4 control channel and the print control channel) correspond to plural types of logic packets, and the various type (commands) of D4 packets (the credit request packet, the print data packet or the like) transmitted through the logic channels correspond to the plural types of logic packets. That is, the plural types of packets classified by a predetermined identifier included in the D4 packet correspond to the plural types of logic packets.

A3. Packet Reception Process of Printer 100

Figure 5:
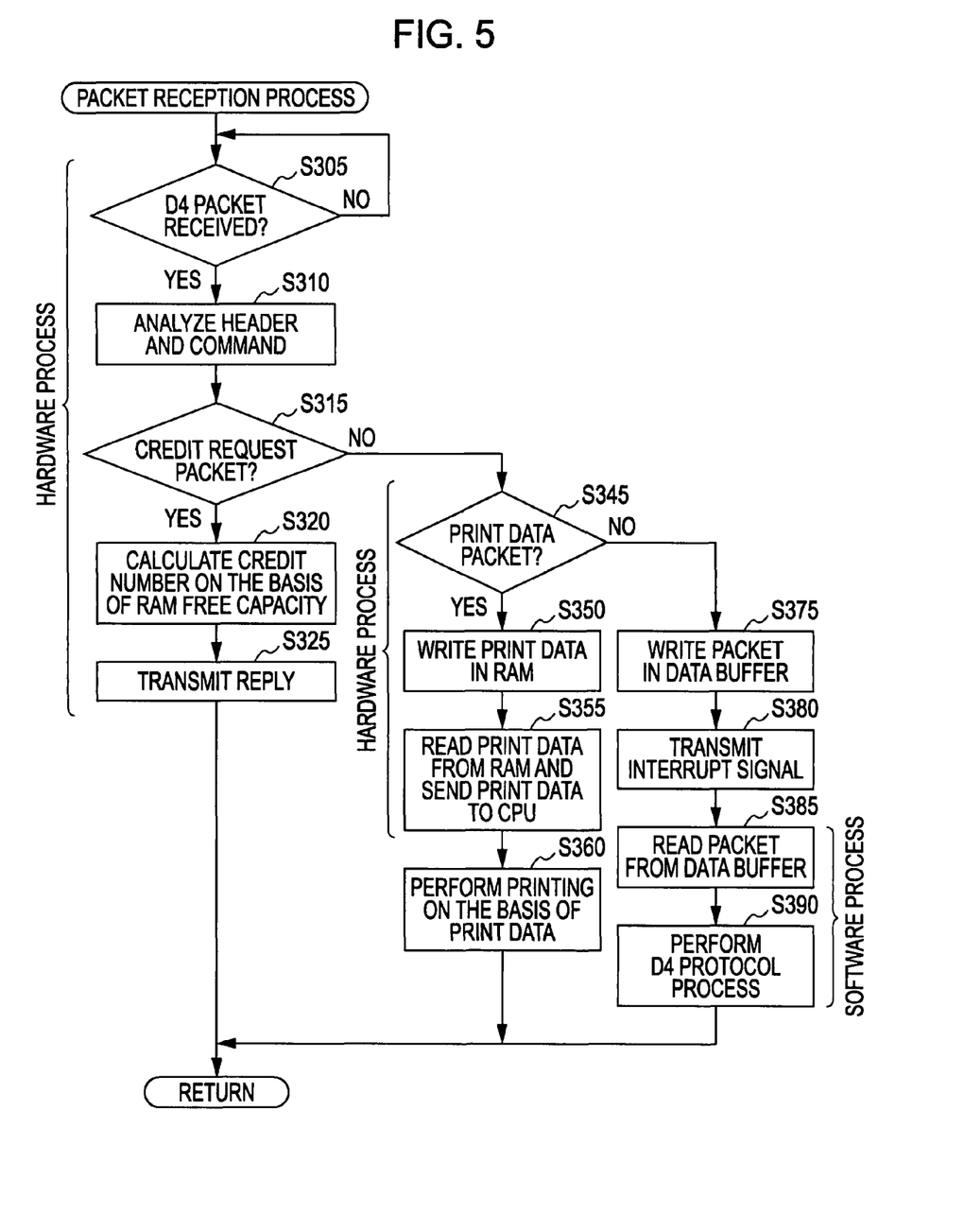
FIG. 5 is a flowchart showing a packet reception process according to the first embodiment of the invention.

FIG. 5 is a flowchart showing a packet reception process according to the first embodiment of the invention. In the printer 100, if a power source is turned on, the packet reception process is started in order to receive various D4 packets.

When the packet reception process shown in FIG. 5 is started, the header/command analysis unit 121 (FIG. 1) stands by until the D4 packet is received through the USB control module 110 (step S305). When the D4 packet is received, the header/command analysis unit 121 analyzes the D4 header and the command of the body portion of the received D4 packet (step S310). Next, the header/command analysis unit 121 determines whether the received D4 packet is the credit request packet (step S315). In more detail, the header/command analysis unit 121 determines whether the received D4 packet is the "D4 control channel" by the logic channel ID of the header of the received D4 packet and determines whether a value indicating the "credit request" is stored in the command field of the body portion if it is determined to the D4 control channel.

When the received D4 packet is the credit request packet, the header/command analysis unit 121 sends the body portion of the received D4 packet to the reply generation unit 123. The reply generation unit 123 calculates the credit number on the basis of the free capacity of the RAM 140 notified from the RAM free capacity calculation unit 134 (step S320). As described above, since the free capacity of the RAM 140 is periodically notified from the RAM free capacity calculation unit 134, the reply generation unit 123 divides a new free capacity by the size of the D4 packet and calculates the credit number. Next, the reply generation unit 123 generates the credit request reply packet for notifying the calculated credit number and transmits the credit request reply packet to the personal computer 10 through the USB control module 110 (step S325). The steps S305 to S325 are performed by the hardware without through the microprocessor 150, as denoted by the arrow of the thick line of FIG. 1.

In contrast, when the received D4 packet is not the credit request packet, the header/command analysis unit 121 determines whether the received D4 packet is the print data packet (step S345). This determination can be executed by determining whether the logic channel ID of the received D4 packet is the ID of the print data channel.

When the received D4 packet is the print data, the header/command analysis unit 121 sends the body portion (print data) of the received D4 packet to the store module 131. The store module 131 writes the print data in the address of the RAM 140 instructed by the store address management unit 132 (step S350). Next, the load module 135 reads the print data from the address of the RAM 140 specified by the load address management unit 133 and sends the print data to the microprocessor 150 (step S355). In the microprocessor 150, the print processing unit 152 drives the printer engine 160 and performs the printing process on the basis of the print data received from the load module 135 (step S360). The steps S345 to S355 are performed by the hardware without through the microprocessor 150, as denoted by the arrow of the thick dotted line of FIG. 1.

In the step S345, if it is determined that the received D4 packet is not the print data, the header/command analysis unit 121 writes the received D4 packet in the data buffer 122 (step S375) and transmits an interrupt signal to the microprocessor 150 (step S380). The interrupt signal is used to notify the data buffer 122 that the D4 packet is written. In the microprocessor 150, when the interrupt signal is received, the D4 protocol processing unit 151 reads the D4 packet from the data buffer 122 (step S385), and analyzes the D4 packet to perform a predetermined D4 protocol (step S390). The steps S385 and S390 are performed by software.

In more detail, for example, when the received D4 packet is the open channel request packet (the step [1] of FIG. 4), the packet is sent to the D4 protocol processing unit 151 through the data buffer 122 and is processed by the D4 protocol processing unit 151, because the received D4 packet is not the credit request packet and the print data packet. The D4 protocol processing unit 151 transmits the open channel request reply packet to the personal computer 10 through the USB control module 110 when the requested print data channel can be opened (the step [2] of FIG. 4).

As described above, in the printer 100, the D4 packet received from the personal computer 10 is sorted by the logic channel ID of the header and the value of the command field of the body portion. The credit request packet and the print data packet are processed by the hardware and the other packet is processed by the software. Since the credit request packet and the print data packet are frequently received from the personal computer 10 and the credit request packet requires the reply, high load is applied to the module for performing the process when these packets are processed. In the printer 100, since these packets are processed by the hardware, it is possible to suppress the microprocessor 150 from becoming a high load status.

B. Second Embodiment

Figure 6:
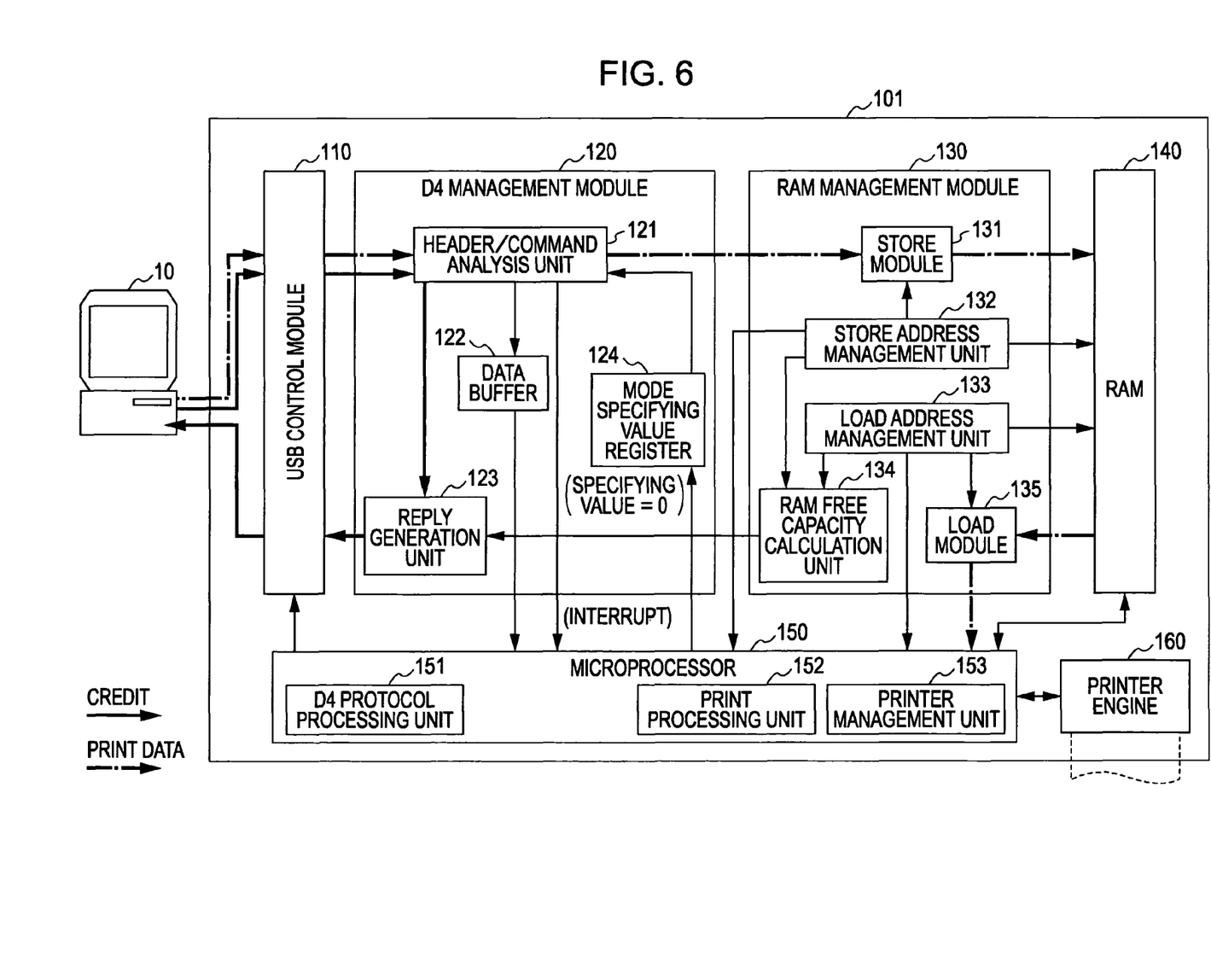
FIG. 6 is a schematic block diagram showing the configuration of a printer according to a second embodiment of the invention.

FIG. 6 is a schematic block diagram showing the configuration of a printer according to a second embodiment of the invention. The printer 101 is equal to the printer 100 shown in FIG. 1 except that a mode specifying value register 124 is included in the D4 management module. In the printer 100 according to the first embodiment, the D4 packet received from the personal computer 10 is sorted into the packet to be processed by the hardware (the credit request packet and the print data packet) and the packet to be processed by the software (the other packet) and is processed. In contrast, in the printer 101 according to the second embodiment, a mode for sorting and processing the D4 packet (sort processing mode) and a mode for processing all the D4 packets by the software (software processing mode) are set and are switched to process the D4 packet. The sort processing mode corresponds to a first processing mode and the software processing mode corresponds to a second processing mode. The printer management unit 153 corresponds to a processing mode switching unit.

The switching of the processing mode is controlled. In more detail, the printer management unit 153 acquires alert information such as the residual quantity of the ink or a paper jam from the printer engine 160 and manages the status of the printer 100. The printer management unit 153 controls the processing mode to be switched from the sort processing mode to the software processing mode when the residual quantity of the ink is very low or the paper jam occurs such that the operation status of the printer 100 becomes an error status. The reason why such control is performed is as follows. In the sort processing mode, the credit number is notified to the personal computer 10 by the hardware process, as described in the first embodiment. Accordingly, even when the printing process cannot be performed because the operation status of the printer 10 is the error status, the print data is sequentially received from the personal computer 10. Accordingly, when the operation status is the error status, the processing mode is switched to the software processing mode and the credit number is notified in consideration of the free capacity of the RAM 140 and the operation status of the printer 100.

The mode specifying value register 124 (FIG. 6) is used to store a specifying value for specifying the processing mode. In more detail, the printer management unit 153 writes "1" indicating the software processing mode in the mode specifying value register 124 when the operation status of the printer 100 is the error status and writes "0" indicating the sort processing mode when the operation status of the printer 100 is a normal status (an error-free status)

Figure 7:
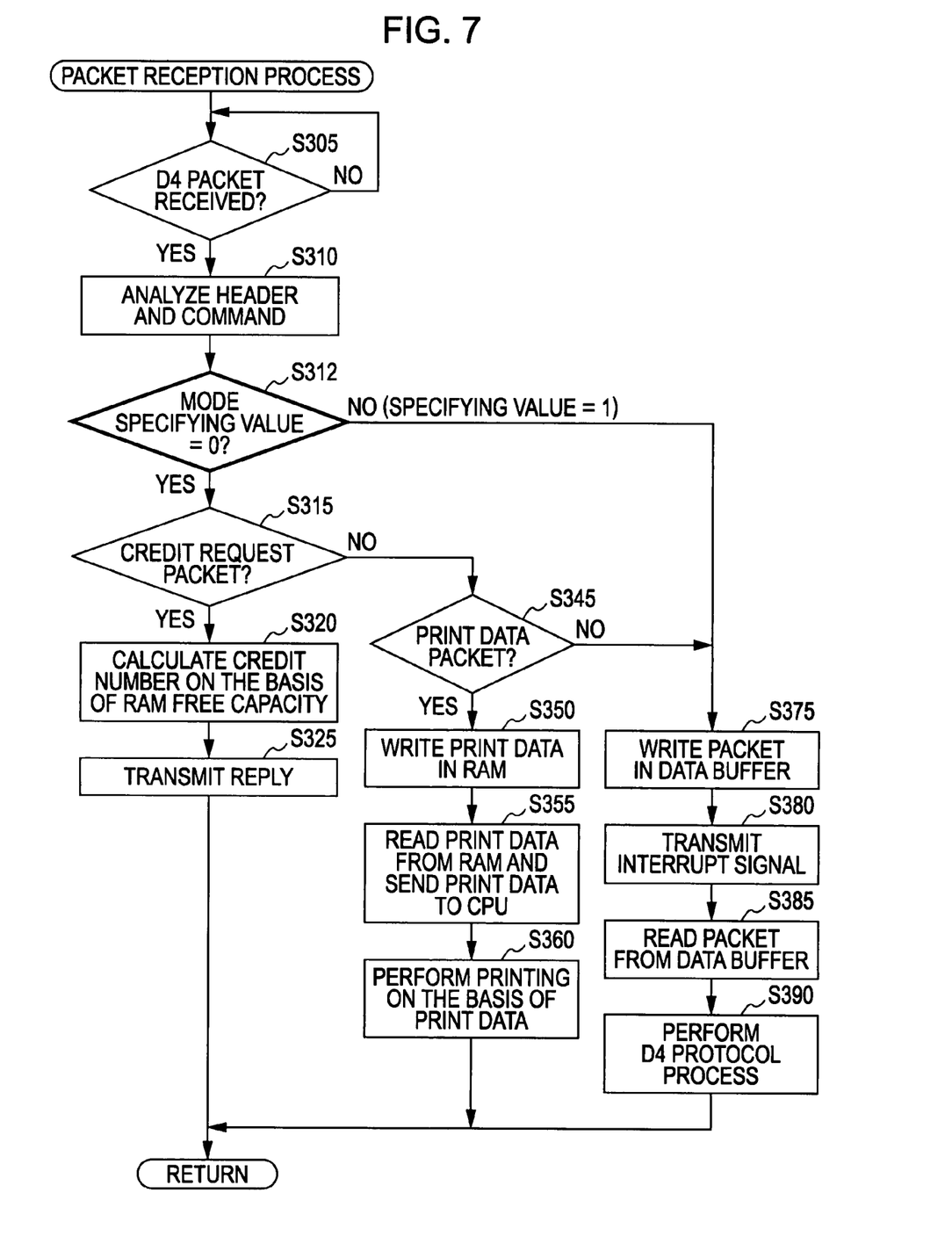
FIG. 7 is a flowchart showing a packet reception process according to the second embodiment of the invention.

FIG. 7 is a flowchart showing a packet reception process according to the second embodiment of the invention. The process according to the second embodiment is equal to the process according to the first embodiment except that a step S312 is added to the flowchart of FIG. 5. When the header and the command of the D4 packet is analyzed in the step S310, the header/command analysis unit 121 reads the value of the mode specifying value register 124 and determines whether the mode specifying value is "0" (step S312). When the mode specifying value is "0", the sort processing mode is specified and the printer 100 performs the same process as the first embodiment. Accordingly, the flow of the credit request packet and the credit request reply packet and the flow of the print data packet of FIG. 7 are equal to those of FIG. 1. In contrast, when the mode specifying value is "1", the software processing mode is specified. In this case, the processing mode is switched to the software processing mode and the steps S375 to S390 are performed.

Figure 8:
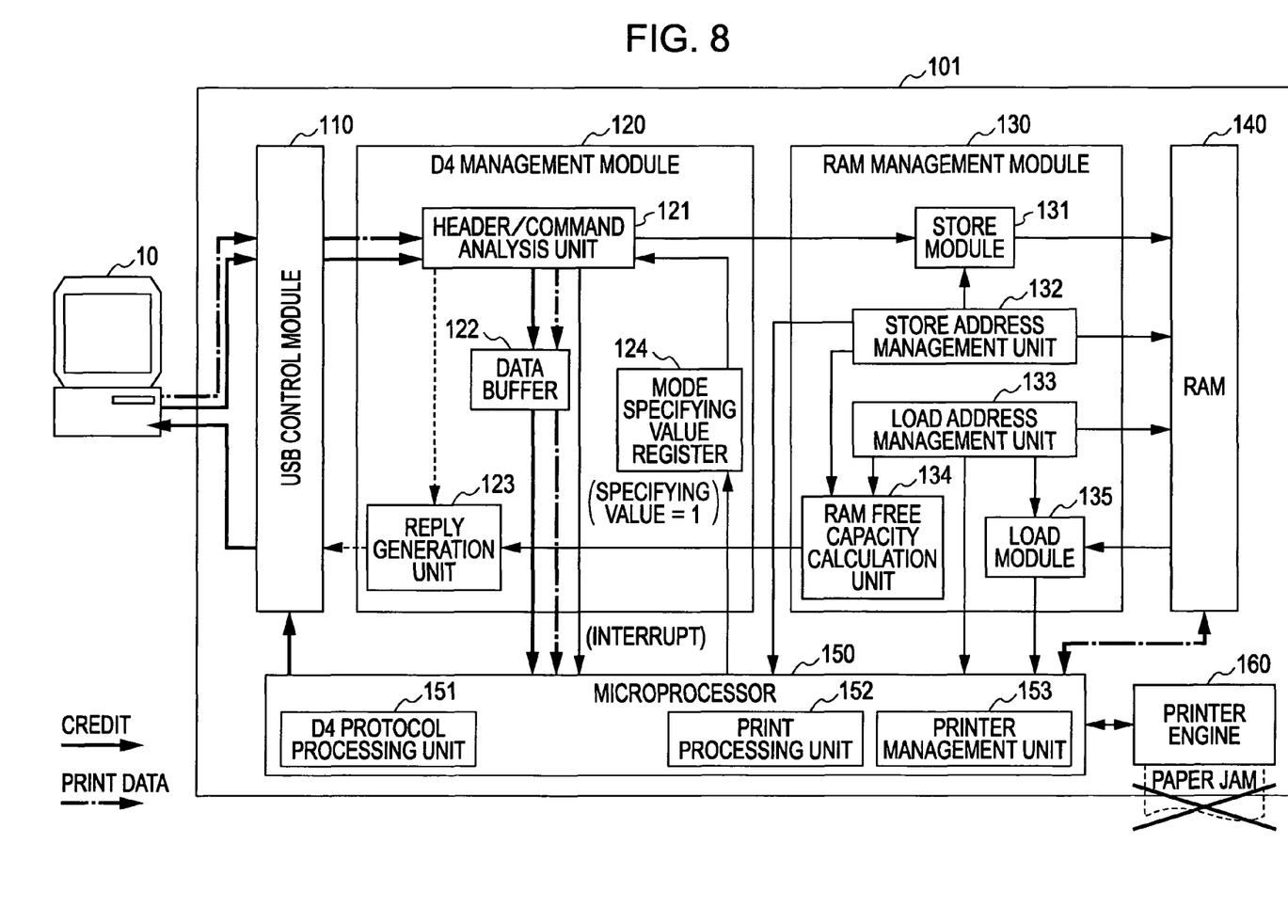
FIG. 8 is a view showing a data flow in the printer 101 in a software processing mode.

FIG. 8 is a view showing a data flow in the printer 101 in the software processing mode. In the software processing mode, since the steps S375 to S390 (FIG. 7) are performed, all the D4 packets are sent to the D4 protocol processing unit 151 through the data buffer 122. Accordingly, the credit request packet, the credit request reply packet and the print data packet are processed by the D4 protocol processing unit 151 (the arrow of the thick solid line and the arrow of the dotted line). In the example of FIG. 8, since the paper jam occurs in the printer engine 160, the mode specifying value of "1" is written in the mode specifying value register 124. Accordingly, since the credit request packet is sent to the D4 protocol processing unit, the D4 protocol processing unit 151 can notify the personal computer 10 of the credit number according to the operation status of the printer 100. For example, in the error status such as the paper jam, the D4 protocol processing unit 151 may transmit the credit number of "0" such that the print data cannot be received from the personal computer 10. In a predetermined period immediately after solving the paper jam and returning to the normal status, the credit number of "1" is transmitted and, after a lapse of a predetermined period, "0" is written in the mode specifying value register 124 such that the processing mode is switched to the sort processing mode.

C. Third Embodiment

Figure 9:
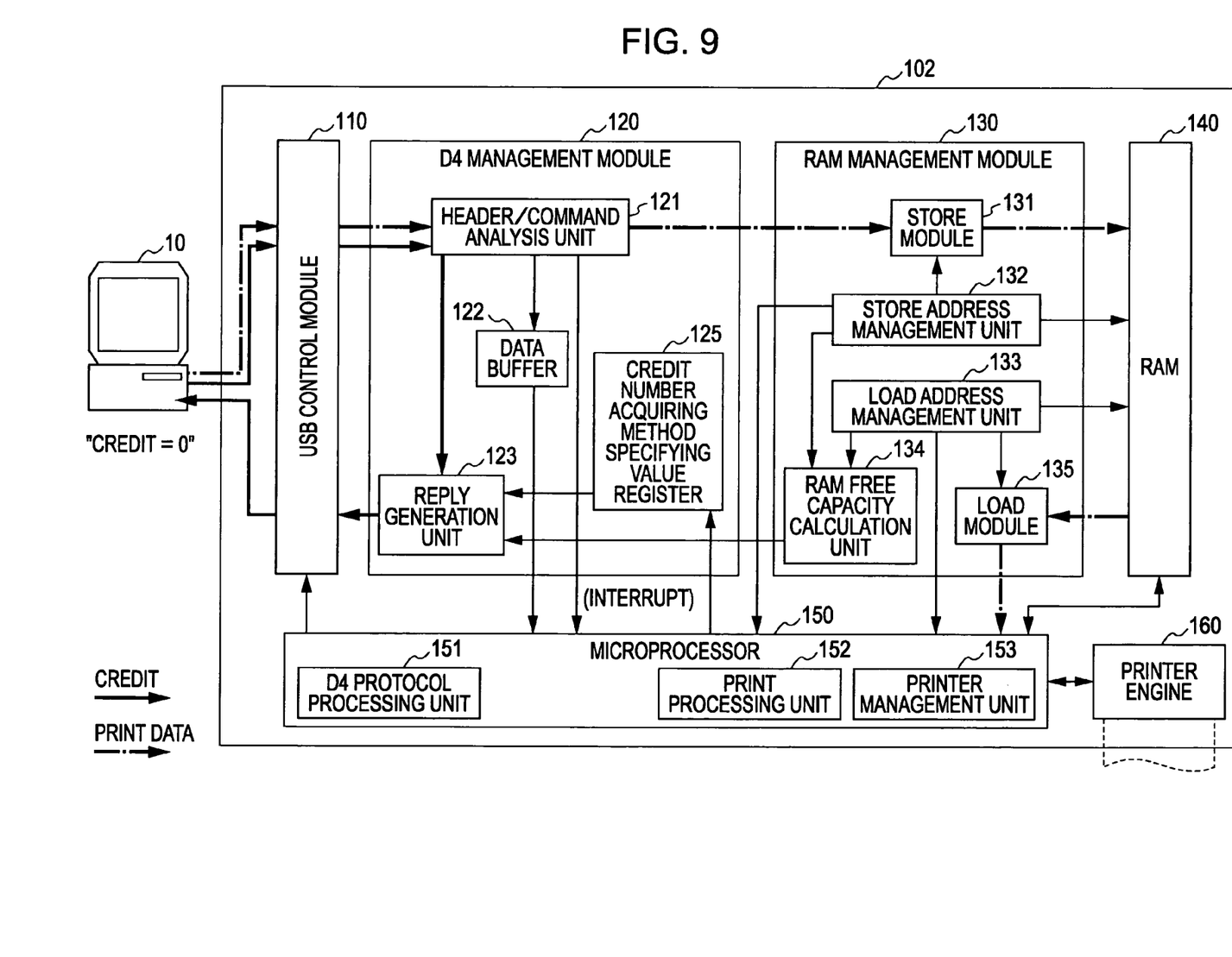
FIG. 9 is a schematic block diagram showing the configuration of a printer according to a third embodiment of the invention.

FIG. 9 is a schematic block diagram showing the configuration of a printer according to a third embodiment of the invention. The printer 102 is equal to the printer 100 shown in FIG. 1 except that a credit number acquiring method specifying value register 125 is included in the D4 management module. In the second embodiment, the processing mode of the printer 101 is switched to the sort processing mode or the software processing mode such that the credit number according to the operation status of the printer 101 is notified to the personal computer 10. In contrast, in the third embodiment, only the sort processing mode is used as the processing mode and the credit number according to the operation status of the printer 102 is notified to the personal computer 10.

In the printer 102, as a method of obtaining the credit number by the reply generation unit 123 includes a method of calculating the credit number on the basis of the free capacity of the RAM 140 notified from the RAM free capacity calculation unit 134 and a method of obtaining the credit umber by the notification (specifying) of the printer management unit 153. When the operation status of the printer 102 is the error status, the reply generation unit 123 acquires the credit number by the notification of the printer management unit 153 and calculates and acquires the credit number in the normal status, similar to the first embodiment.

The switching of the method of acquiring the credit number is controlled by the printer management unit 153. In more detail, the printer management unit 153 writes "0" as a credit number acquiring method specifying value in the credit number acquiring method specifying value register 125 when the operation status of the printer 102 is the error status. The specifying value of "0" is a value for specifying the method of acquiring the credit number by the notification of the printer management unit 153 and a value for specifying the credit number of "0". In contrast, the printer management unit 153 writes "1" in the credit number acquiring method specifying value register 125 when the operation status of the printer 102 is the normal status. The specifying value of "1" is a value for specifying the method of calculating the credit number on the basis of the free capacity notified from the RAM free capacity calculation unit 134.

Figure 10:
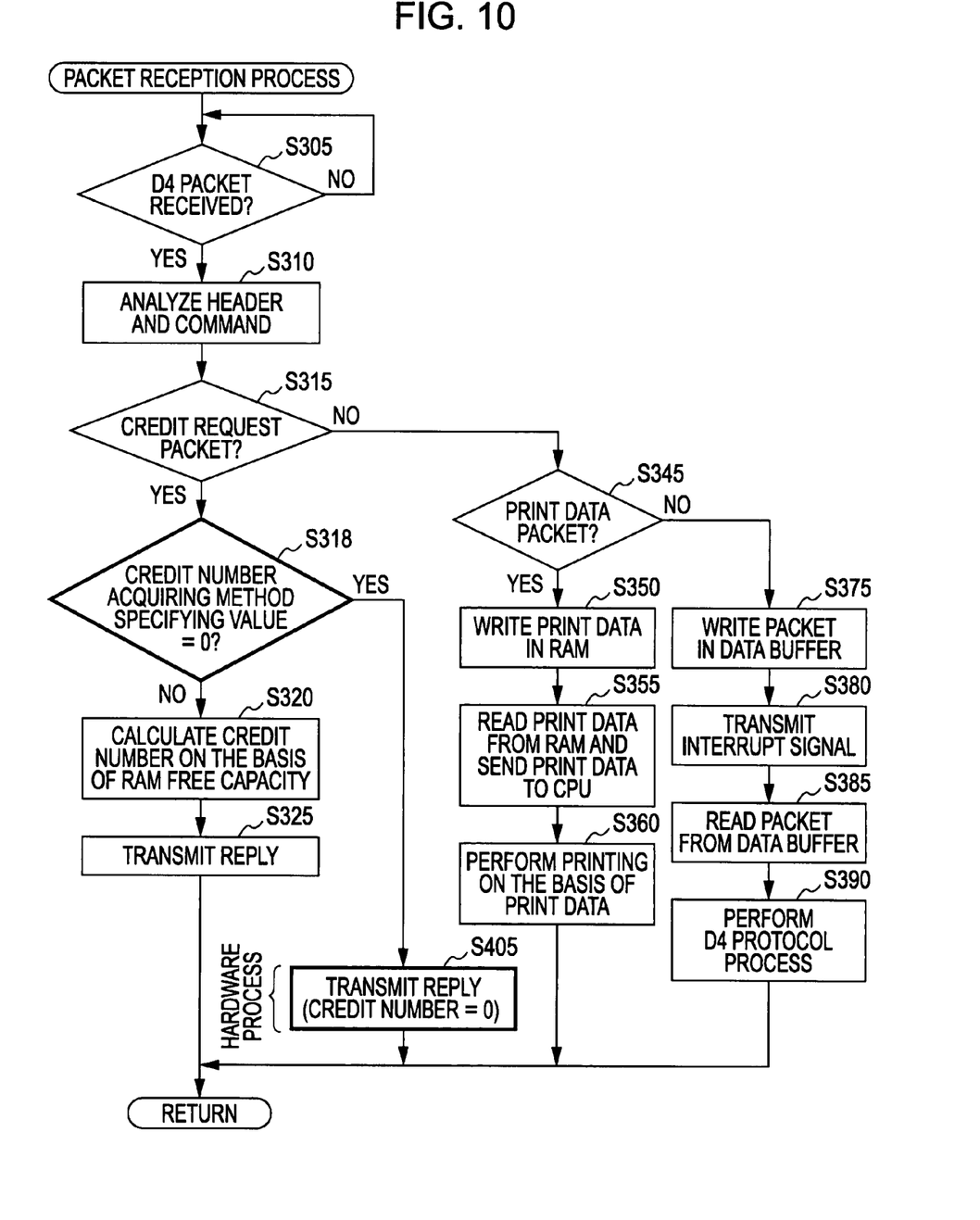
FIG. 10 is a flowchart showing a packet reception process according to the third embodiment of the invention.

FIG. 10 is a flowchart showing a packet reception process according to the third embodiment of the invention. The process according to the third embodiment is equal to the process according to the first embodiment except that steps S318 and S405 are added to the flowchart shown in FIG. 5. In a step s315, if it is determined that the received D4 packet is the credit request packet, the reply generation unit 123 reads the credit number acquiring method specifying value from the credit number acquiring method specifying value register 125 and determines whether the credit number acquiring method specifying value is 0 (step S318). If the specifying value is not 0, that is, if the specifying value is 1, the reply generation unit 123 performs the steps S320 and S325, calculates the credit number on the basis of the free capacity of the RAM 140, and notifies the personal computer 10 of the credit number. In contrast, if the credit number acquiring method specifying value is 0, the reply generation unit 123 notifies the personal computer 10 of the credit number of 0 (step S405).

By the above-described configuration, the credit request packet is processed by the hardware and, when the operation status of the printer 102 is the error status, the credit number of 0 is transmitted such that the print data is not received from the personal computer 10.

D. Modified Example

Among the elements of the embodiments, elements excluding elements described in independent claims may be omitted. The invention is not limited to the embodiments or the examples and may be variously changed without departing from the scope of the invention. The modified examples are as follows.

D1. Modified Example 1

Although the credit request packet, the credit request reply packet and the print data packet are used as the D4 packets processed by the hardware in the above-described embodiments, the invention is not limited to this and other D4 packets may be processed by the hardware. In more detail, a status request packet and a status request reply packet may be processed by the hardware. As described above, the status request packet is used when the personal computer 10 requests for the statuses (the residual quantity of the ink) of the printers 100 to 102 and the status request reply packet is used when the personal computer 10 notifies the statuses of the printers 100 to 102. In the status request reply packet, the operation statuses of the printers 100 to 102 such as the residual quantity of the ink are described as parameters. The status such as the residual quantity of the ink is acquired by the software. In more detail, the printer management unit 153 acquires the status from the printer engine 160. In order to transmit the status request reply packet by the hardware, the printer management unit 153 acquires the status when the processing load of the microprocessor 150 is relatively low, and records the residual quantity of the ink in a status recording register (not shown) for recording the status. When the status request packet is received, the reply generation unit 123 reads the value of the status recording register and generates and transmits the status request reply packet including the value. Since the status request packet is periodically transmitted/received through the printer control channel, the status request packet is a reply-requiring logic packet which has a relatively high frequency of performing the process and requires a reply. Accordingly, it is possible to remarkably reduce the processing load of the microprocessor 150 by processing the status request packet by the hardware.

D2. Modified Example 2

Although the processing mode is switched according to whether the operation status of the printer 101 is the error status or not in the second embodiment, the invention is not limited to this and the processing mode may be switched by any operation status. For example, the processing mode may be switched to the sort processing mode during warming-up immediately after start-up and may be switched to the software processing mode when the warming-up is completed. The processing mode may be switched according to the degree of the processing load of the microprocessor 150. In more detail, the processing mode may be switched to the sort processing mode when the usage rate of the microprocessor 150 is equal to or greater than 80% and may be switched to the software processing mode when the usage rate of the microprocessor 150 is less than 80%.

D3. Modified Example 3

Although the processing mode is switched according to the operation status of the printer 101 in the second embodiment, the invention is not limited to this and the processing mode may be switched according to a predetermined parameter specified by the personal computer 10. For example, when the printer 101 has a high quality print mode for performing a high-quality printing process and a high speed print mode for performing a high-speed printing process with low quality as a print mode, the processing mode may be switched by the print mode specified by the personal computer 10. In more detail, when the high quality print mode is specified by the personal computer 10 and the print data is received from the personal computer 10, the processing mode is switched to the sort processing mode and, when the high speed print mode is specified by the personal computer 10 and the print data is received from the personal computer 10, the processing mode is switched to the software processing mode. The reason why the processing mode is switched according to the print mode is as follows. That is, in the high quality print mode, since a large amount of print data is transmitted from the personal computer 10 to the printer 101, the microprocessor 150 is susceptible to a high load status in order to process the large amount of print data. Accordingly, in this case, the processing mode is switched to the sort processing mode to perform the process of a portion of the D4 packets such that the microprocessor 150 is suppressed from becoming the high load status. The specifying of the print mode is described in a top of the print data received from the personal computer 10 and the printer 101 analyzes the print data to identify the specified print mode.

In general, in the printer, the cancel of a print job may be specified by receiving a print data packet in which a specific value is stored in a control information field. When such a print data packet is received, the processing mode may be switched from the sort processing mode to the software processing mode.

D4. Modified Example 4

Although the software process (the process using the D4 protocol processing unit 151) is performed with respect to all the D4 packets in the software processing mode in the second embodiment, the invention is not limited to this and the hardware process may be switched to the software process with respect to a portion of the D4 packets. For example, in the software processing mode, the hardware process may be switched to the software process with respect to the credit request packet and the hardware process may be performed with respect to the print data packet regardless of the processing mode. Even by this configuration, it is possible to notify the personal computer 10 of the credit number according to the operation status of the printer.

D5. Modified Example 5

Although the credit number transmitted to the personal computer 10 is changed according to the operation status of the printer 101 or 102 in the second embodiment or the third embodiment, the invention is not limited to this and an interval of transmitting the credit number may be changed instead of the credit number. In more detail, when the operation status of the printer is the error status, an interval from a time point when the credit request packet is received to a time point when the credit request reply packet is transmitted may be larger than that of the normal status. In the error state, since an interval of transmitting the print data is large in the personal computer 10, it is possible to prevent a large amount of print data from being continuously received in a state in which the printing process cannot be performed.

D6. Modified Example 6

Although the logic packets processed in the packet reception process are the D4 packets in the embodiments, the invention is not limited to this. The above-described packet reception process may be performed with respect to any logic packet if the logic packets are plural types of logic packets which are transmitted/received between the personal computer and the printer.

What is claimed is:

1. A printing device connected to a client, the printing device comprising:
   a reception unit which receives plural types of logic packets from the client;
   a hardware packet processing unit which processes logic packets by hardware;
   a software packet processing unit which is implemented on a microprocessor and processes logic packets by software; and
   a sorting unit which is not implemented on the microprocessor and sorts the plural types of logic packets into one or more types of logic packets to be processed by the hardware packet processing unit and one or more types of logic packets to be processed by the software packet processing unit,
   wherein the sorting unit sorts a reply-requiring logic packet, including contents for replying to the client, as a type of logic packet to be processed by the hardware packet processing unit when sorting the plural types of logic packets; and
   wherein:
   the sorting unit sorts a credit request packet for transmitting print data as the type of logic packet to be processed by the hardware packet processing unit when a high quality print mode is set and sorts the credit request packet for transmitting the print data as the type of logic packet to be processed by the software packet processing unit when a low quality print mode is set.

2. The printing device according to claim 1, wherein the reply-requiring logic packet is a credit request packet for requesting a credit for controlling a flow between the client and the printing device.

3. The printing device according to claim 1, wherein:
   each of the logical packets includes a header portion and a body portion, and
   the plural types of the logic packets are identified by an identifier included in the header portion or a combination of the identifier included in the header portion and an identifier included in the body portion.

4. A printing device connected to a client, the printing device comprising:
   a reception unit which receives plural types of logic packets from the client;
   a software packet processing unit which is implemented on a microprocessor and processes logic packets by software;
   a hardware packet processing unit which is not implemented on the microprocessor and processes logic packets by hardware; and
   a processing mode switching unit which switches within the printing device a processing mode to a first processing mode for processing a specific type of logic packet by the hardware packet processing unit or a second processing mode for processing the specific type of logic packet by the software packet processing unit, according to an operation status of the printing device; and:
   a sorting unit that sorts a credit request packet for transmitting print data as the type of logic packet to be processed by the hardware packet processing unit when a high quality print mode is set and sorts the credit request packet for transmitting the print data as the type of logic packet to be processed by the software packet processing unit when a low quality print mode is set; 1.

5. The printing device according to claim 4, wherein the processing mode switching unit switches the processing mode to the second processing mode when the operation status of the printing device is an error status and switches the processing mode to the first processing mode when the operation status of the printing device is a normal status.

6. A logic packet processing method comprising:
   processing plural types of logic packets received from a client in a printing device which is connected to the client and includes a hardware packet processing unit which processes logic packets by hardware and a software packet processing unit which is implemented on a microprocessor and processes logic packets by software,
   sorting the plural types of logic packets into one or more type of logic packets to be processed by the hardware packet processing unit when a high quality print mode is set and one or more type of logic packets to be processed by the software packet processing unit when a low quality print mode is set,
   wherein, in the sorting of the plural types of logic packets, a reply-requiring logic packet, including contents for replying to the client, is sorted as a type logic packet to be processed by the hardware packet processing unit when sorting the plural types of logic packets; and the sorting is not performed by the microprocessor.

* * * * *